(12) United States Patent
Davis

(10) Patent No.: US 7,119,602 B2
(45) Date of Patent: Oct. 10, 2006

(54) LOW-SKEW SINGLE-ENDED TO DIFFERENTIAL CONVERTER

(75) Inventor: Bradley Kendall Davis, Fort Collins, CO (US)

(73) Assignee: Koninklijke Philips Electronics N.V., Eindhoven (NL)

(*) Notice: Subject to any disclaimer, the term of this patent is extended or adjusted under 35 U.S.C. 154(b) by 11 days.

(21) Appl. No.: 10/957,140

(22) Filed: Sep. 30, 2004

(65) Prior Publication Data

US 2006/0066377 A1    Mar. 30, 2006

(51) Int. Cl.
*H03K 17/62* (2006.01)
(52) U.S. Cl. .................................. 327/415; 327/258
(58) Field of Classification Search .................. None
See application file for complete search history.

(56) References Cited

U.S. PATENT DOCUMENTS

| | | | | |
|---|---|---|---|---|
| 4,700,370 A | * | 10/1987 | Banerjee et al. | 377/55 |
| 4,797,838 A | * | 1/1989 | Nelson et al. | 326/94 |
| 5,301,147 A | * | 4/1994 | Guo et al. | 365/154 |
| 5,612,632 A | * | 3/1997 | Mahant-Shetti et al. | 326/46 |
| 5,764,086 A | | 6/1998 | Nagamatsu et al. | 327/65 |
| 5,852,378 A | | 12/1998 | Keeth | 327/171 |
| 5,929,710 A | | 7/1999 | Bien | 330/301 |
| 5,945,878 A | | 8/1999 | Westwick et al. | 330/301 |
| 5,959,472 A | | 9/1999 | Nagamatsu et al. | 327/108 |
| 6,028,455 A | * | 2/2000 | Yamauchi | 327/52 |
| 6,069,510 A | | 5/2000 | Keeth | 327/170 |
| 6,111,431 A | | 8/2000 | Estrada | 326/83 |
| 6,208,186 B1 | * | 3/2001 | Nair | 327/199 |
| 6,275,073 B1 | | 8/2001 | Tokuhiro | 327/66 |
| 6,670,826 B1 | * | 12/2003 | Bauer | 326/46 |
| 6,947,310 B1 | * | 9/2005 | Marshall et al. | 365/145 |
| 2002/0171453 A1 | * | 11/2002 | Kanamori et al. | 327/57 |
| 2003/0080793 A1 | * | 5/2003 | Pilling | 327/202 |
| 2004/0135611 A1 | * | 7/2004 | Tohsche | 327/218 |

* cited by examiner

*Primary Examiner*—Timothy P. Callahan
*Assistant Examiner*—Cassandra Cox

(57) ABSTRACT

A single-ended to differential converter uses a cross-coupled latch that maximizes the output zero-crossing symmetry and is self compensating over PVT variations. An in-phase driving signal is provided by an always-on transmission gate coupled to the input. An out-of-phase driving signal is provided by an inverter coupled to the input. The in-phase and out-of-phase driving signals each drive an input of the cross-coupled latch. The in-phase driving signal from the always-on transmission gate starts to bring the cross-coupled latch into conduction, and when the out-of-phase driving signal arrives, the simultaneous driving of the cross-coupled latch causes a rapid and symmetric transition of both outputs of the cross-coupled latch.

10 Claims, 2 Drawing Sheets

LOW-SKEW SINGLE-ENDED TO DIFFERENTIAL CONVERTER

FIELD OF THE INVENTION

This invention relates to the field of electronic circuits, and in particular, to a circuit that converts a single-ended signal into a pair of differential signals with low skew between the differential signals.

BACKGROUND ART

Differential signals are commonly used in electronic circuits and systems. In information-carrying signals, the use of differential signals provides the opportunity to apply noise-canceling techniques. In clocking signals, differential clocks are commonly used to provide high-speed switching capabilities.

The use of differential signaling typically requires complementary symmetry between the pair of differential signals, including coincident switching. An offset of switching time between the pair of differential signals is termed "skew", and low-skew circuits are preferred for optimal differential signal processing, particularly at high speeds.

FIG. 1 illustrates a conventional circuit for converting a single-ended signal In into a pair of differential signals Q, Qn. The pair of inverters 110, 120 provide an output Q that is in phase with the input signal In, and the single inverter 130 provides an output Qn that is out of phase with the input signal In, and thus out of phase with the output Q. The skew of this circuit corresponds to the difference between the propagation time though the pair of inverters 110, 120 and the propagation time though the single inverter 130. Nominally, the skew of the circuit of FIG. 1 is equal to one inverter delay duration, because the output Qn transitions after one inverter delay, and output Q transitions after two inverter delays. Techniques can be applied to size the components of the inverters 110, 120, 130 to reduce the transition speed of inverter 130 compared to the inverters 110, 120, but such techniques typically exhibit a strong dependency on process, voltage, and temperature (PVT) parameters to achieve low-skew. Additionally, in a CMOS embodiment, the 0-to-1 and 1-to-0 transition characteristics will also vary differently over PVT variations.

The circuit of FIG. 2 reduces the skew of the circuit of FIG. 1 by placing an inverter 240 between the output Q and the output Qn. During a transition of the input In, the output of the inverter 130 tries to change immediately, but the inverter 240 holds the prior state, because the transition has not yet propagated through inverters 110, 120. Thus, the inverter 240 delays the transition of the output Qn, thereby reducing the transition delay to less than one inverter delay. Although the circuit of FIG. 2 exhibits a lower skew, it draws more power than the circuit of FIG. 1, particularly in a CMOS embodiment, because the conflicting states of the inverters 130 and 240 keeps the inverter 130 in the active region during the delayed transition of the output Qn. The circuit of FIG. 2 also exhibits poor consistency over a range of PVT parameters.

The circuit of FIG. 3 exhibits fairly low skew, provided that the exclusive-nor gates 310, 320 can be designed with symmetric 0-to-1 and 1-to-0 transition delay characteristics. However, achieving such symmetry is difficult, particularly over a range of PVT parameters.

U.S. Pat. No. 5,945,878, "SINGLE-ENDED TO DIFFERENTIAL SIGNAL CONVERTER", issued 31 Aug. 1999 to Westwick et al., and incorporated by reference herein, illustrates a low-skew converter, as illustrated in FIG. 4. In this embodiment, a common-gate transistor 410 is used to provide the in-phase output Q, and a common-source transistor 420 is used to provide the out-of-phase output Qn. The sizes of the devices 410, 420 and the bias current are controlled to provide equal transimpedances through each of the devices 410, 420 to provide symmetric outputs Q, Qn. The circuit of FIG. 4 provides low skew, but it employs coupling capacitors that limit its application to dynamic circuits, and cannot be used for static circuits. Additionally, it cannot be driven by rail-to-rail CMOS logic transitions.

SUMMARY OF THE INVENTION

It is an object of this invention to provide a single-ended to differential converter that exhibits low skew. It is a further object of this invention to provide a single-ended to differential converter that exhibits low static power dissipation. It is a further object of this invention to provide a single-ended to differential converter that exhibits consistent performance over a wide range of PVT parameters. It is a further object of this invention to provide a single-ended to differential converter that operates at very high frequencies.

These objects and others are achieved by providing a single-ended to differential converter that uses a cross-coupled latch that maximizes the output zero-crossing symmetry and is self compensating over PVT variations. An in-phase driving signal is provided by an always-on transmission gate coupled to the input. An out-of-phase driving signal is provided by an inverter coupled to the input. The in-phase and out-of-phase driving signals each drive an input of the cross-coupled latch. The in-phase driving signal from the always-on transmission gate starts to bring the cross-coupled latch into conduction, and when the out-of-phase driving signal arrives, the simultaneous driving of the cross-coupled latch causes a rapid and symmetric transition of both outputs of the cross-coupled latch.

Figure 1:
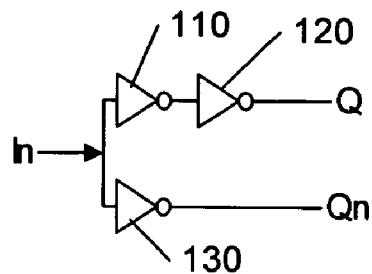
FIGS. 1–4 illustrate example prior art single-ended to differential converters.
Figure 2:
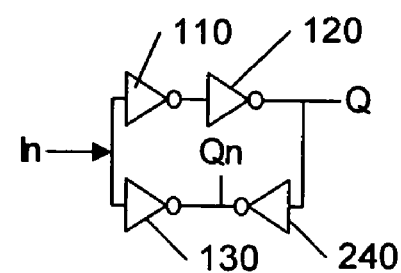
Figure 3:
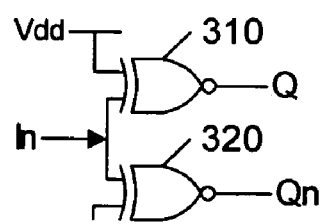
Figure 4:
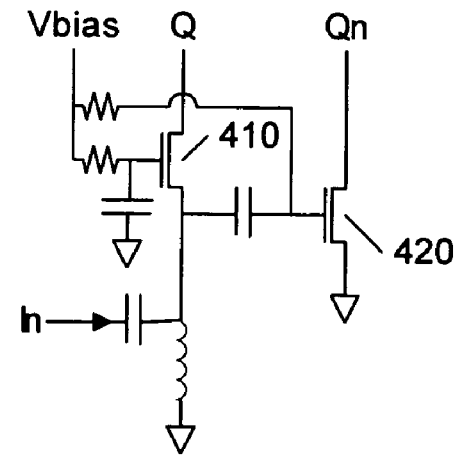

Throughout the drawings, the same reference numeral refers to the same element, or an element that performs substantially the same function. Also, the timing diagrams are intended to illustrate nominal characteristics of the operation of the circuits and are not drawn to scale. These diagrams may present such characteristics in exaggerated form for ease of illustration.

DETAILED EMBODIMENTS

Figure 5:
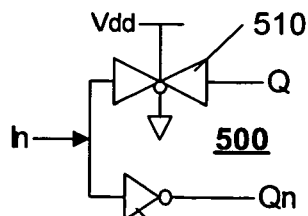
FIG. 5 illustrates an example single-ended to differential converter in accordance with this invention.

FIG. 5 illustrates an example single-ended to differential converter 500 in accordance with this invention. The converter 500 includes a transmission gate 510 that provides an in-phase output Q, and an inverter 520 that provides an out-of-phase signal Qn. The transmission gate 510 is illustrated as a complementary gate, with the active-high gating input tied to voltage source Vdd, and active-low gating input tied to ground. Thus, the transmission gate is always enabled to pass the input signal In to Q.

Figure 6:
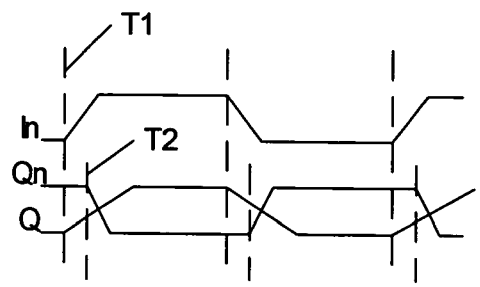
FIG. 6 illustrates an example timing-diagram of the converter of FIG. 5.

FIG. 6 illustrates an example timing-diagram of the converter of FIG. 5. Because the transmission gate 510 is always enabled, a transition of the input In at T1 initiates a virtually simultaneous transition of the output Q at T1. The inverter T2, on the other hand, is in a non-conducting state, and the output Qn exhibits a latency before the transition is initiated, at T2. As illustrated, although the transition of Q is initiated before the transition of Qn, the transition speed of a transmission gate is generally slower than the transition speed of an inverter, and the skew that would have been caused by initiating the transition of Q before the transition is mitigated. By appropriately sizing the components of the transmission gate 510 with regard to the load on Q and relative to the components of the inverter 520, the skew can be minimized.

Figure 7:
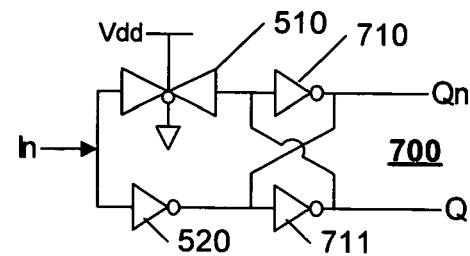
FIG. 7 illustrates an example single-ended to differential converter with a cross-coupled latch in accordance with this invention.
Figure 8:
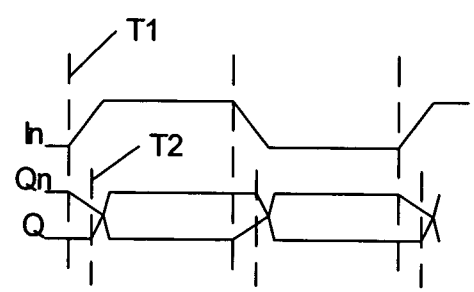
FIG. 8 illustrates an example timing-diagram of the converter of FIG. 7.

The performance and consistency of the circuit 500 can be substantially enhanced by the use of a cross-coupled latch, as illustrated by the circuit 700 of FIG. 7. The latch comprises cross-coupled inverters 710 and 711. The driving signal from the always-on transmission gate 510 starts to bring the inverter 710 into conduction, but the as-yet-unchanged output of the inverter 711 keeps the inverter 710 from transitioning. After the out-of-phase driving signal from inverter 510 arrives, the inverter 711 begins to transition, simultaneously allowing the inverter 710 to transition, because it had already been brought into or near conduction by the driving signal from the always-on transmission gate 510. The large gain due to positive feedback of the cross-coupled inverters 710, 711 regenerates rail-to-rail driving of the outputs Q and Qn, as illustrated in the timing diagram of FIG. 8. Because of the symmetry of inverters 710, 711, the performance of the circuit tracks well over a large range of PVT parameters.

Figure 9:
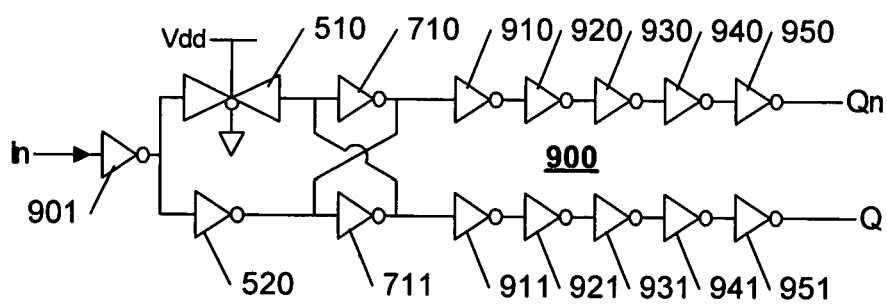
FIG. 9 illustrates an example single-ended to differential converter with cross-coupled latches and output stage amplification in accordance with this invention.
Figure 10:
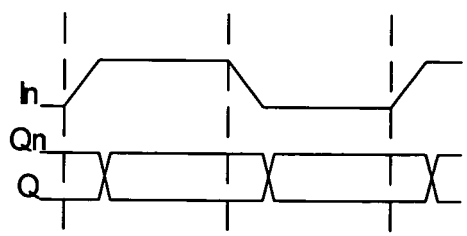
FIG. 10 illustrates an example timing-diagram of the converter of FIG. 5.

The consistency, output symmetry, and drive capability of the circuit 700 can be substantially enhanced by providing input buffering and output amplification, as illustrated by the circuit 900 of FIG. 9. An input buffer/inverter 901 isolates the input In from the capacitive load of the transmission gate 510. The output buffer/inverter pair 910, 911 effectively eliminates the asymmetry of FIG. 8, which is caused by driving cross coupled latch with differing driving signals, to provide a symmetric output as illustrated in FIG. 10.

Inversion strings 910–920–930–940–950 and 911–921–931–941–951 provide output amplification by providing progressively larger components in each stage. In a preferred embodiment, the inverters 710, 711, 910, and 911 are each minimal sized transistors, and each subsequent inverter in each inversion strings is twice as large as the prior inverter. That is, using this sizing algorithm, the inverters 950, 951 will be sixteen times larger than the transistors 910, 911. Alternative sizing schemes can be used to provide any desired drive capability.

One of ordinary skill in the art will recognize that the circuit 900 is particularly well suited for a CMOS embodiment, wherein it requires no biasing, is compatible with both static and dynamic circuit techniques, and draws no static current. Because minimal sizes are used for the conversion, the power requirements are minimal and are primarily determined by the drive capability required. Additionally, it is very well suited for high-speed designs that require minimal skew, and tracks well over a large range of PVT parameters, with minimal design constraints.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the circuit 500 is preferably used to provide the complementary driving signals to the cross-coupled latch 710–711, but alternative techniques may also be used to provide the driving signals. For example, the circuits of FIGS. 1–4, or other conventional differential signal generators can be used to provide the complementary signals that drive the cross-coupled latch 710–711. These and other system configuration and optimization features will be evident to one of ordinary skill in the art in view of this disclosure, and are included within the scope of the following claims.

What is claimed is:

1. A single-ended to differential converter comprising:
   an input stage that provides a first driving signal and a second driving signal from an input signal, the first and second driving signals being out-of-phase with each other, the input stage including:
   a transmission gate, operably coupled to the input signal, that is configured to provide the first driving signal, the transmission gate being configured to be continuously enabled to propagate the input signal to the first driving signal, and
   an input-stage inverter, operably coupled to the input signal, that is configured to provide the second driving signal, and
   a cross-coupled latch, operably coupled to the first and second driving signals, and is configured to provide:
   a first latched signal and
   a second latched signal that is out-of-phase with the first latched signal.

2. The converter of claim 1, further including:
   a first string of inverters, operably coupled to the first latched signal, that is configured to provide a lint output signal, and
   a second string of inverters, operably coupled to the second latched signal, that is configured to provide a second output signal that is out-of-phase with the first output signal.

3. The convener of claim 2, further including
   an input buffer that is configured to couple the input signal to the transmission gate and the input-stage inverter.

4. The converter of claim 2, wherein
   the cross-coupled latch includes:
   a first inverter wit an input coupled to the first driving signal and an output tat provides the first latched signal,
   a second inverter with an input coupled to the second driving signal and an output tat provides the second latched signal,
   wherein
   the output of the first inverter is coupled to the input of the second inverter, and
   the output of the second inverter is coupled to the input of the first inverter.

5. The converter of claim 2, wherein
each of the first and second string of inverters includes progressively larger transistors between the respective first and second latched signals and the first and second output signals.

6. The converter of claim 1, wherein
the cross-coupled latch includes:
- a first inverter with an input coupled to the first driving signal and an output that provides the first latched signal,
- a second inverter with an input coupled to the second driving signal and an output that provides the second latched signal, wherein
the output of the first inverter is coupled to the input of the second inverter, and
the output of the second inverter is coupled to the input of the first inverter.

7. The converter of claim 6, wherein
the first and second inverters and the input stage are embodied using CMOS transistors.

8. The convener of claim 1, further including:
a first string of inverters, operably coupled to the first latched signal, that is configured to provide a first output signal, and
a second string of inverters, operably coupled to the second latched signal, that is configured to provide a second output signal tat is out-of-phase with the first output signal.

9. The convener of claim 8, wherein
the cross-coupled latch includes:
- a first inverter with an input coupled to the first driving signal and an output that provides the first latched signal,
- a second inverter with an input coupled to the second driving signal and an output that provides the second latched signal, wherein
the output of the first inverter is coupled to the input of the second inverter, and
the output of the second inverter is coupled to the input of the first inverter.

10. The converter of claim 8, wherein
each of the first and second string of inverters includes progressively larger transistors between the respective first and second latched signals and the first and second output signals.

* * * * *